United States Patent [19]
Crise

[11] 3,876,027
[45] Apr. 8, 1975

[54] LIQUID COOLED EMERGENCY BRAKE FOR A MOTOR VEHICLE

[76] Inventor: George W. Crise, P.O. Drawer A, Danville, Ohio 43014

[22] Filed: Nov. 21, 1973

[21] Appl. No.: 417,949

[52] U.S. Cl............ 180/70 P; 188/28; 188/75; 188/264 CC; 192/79; 192/113 B; 165/105
[51] Int. Cl............................................ B60k 17/00
[58] Field of Search............ 188/28, 75, 264 CC; 192/79, 113 B; 180/70 R, 70 P

[56] References Cited
UNITED STATES PATENTS

| | | | |
|---|---|---|---|
| 297,089 | 4/1884 | Rutherford | 188/75 X |
| 818,013 | 4/1906 | Bartlett | 188/75 X |
| 1,914,366 | 6/1933 | Franzen | 188/75 X |
| 1,952,967 | 3/1934 | Boughton | 188/264 CC |
| 2,055,267 | 9/1936 | Uffert | 188/75 X |
| 2,111,335 | 3/1938 | Sanford | 188/264 CC |
| 3,217,840 | 11/1965 | Holkesvick | 188/264 CC X |

*Primary Examiner*—George E. A. Halvosa
*Attorney, Agent, or Firm*—William S. Rambo

[57] ABSTRACT

A liquid-cooled emergency brake, operable in combination with the tubular propeller shaft of a motor vehicle. The propeller shaft is provided with a substantially enclosed, liquid-receiving chamber which is partially filled with a vaporizable liquid for absorbing heat generated by frictional engagement of manually operated brake shoes with the chamber portion of the propeller shaft, the liquid being free to flow within the chamber in response to centrifugal and gravitational forces in a manner to provide maximum cooling.

7 Claims, 5 Drawing Figures

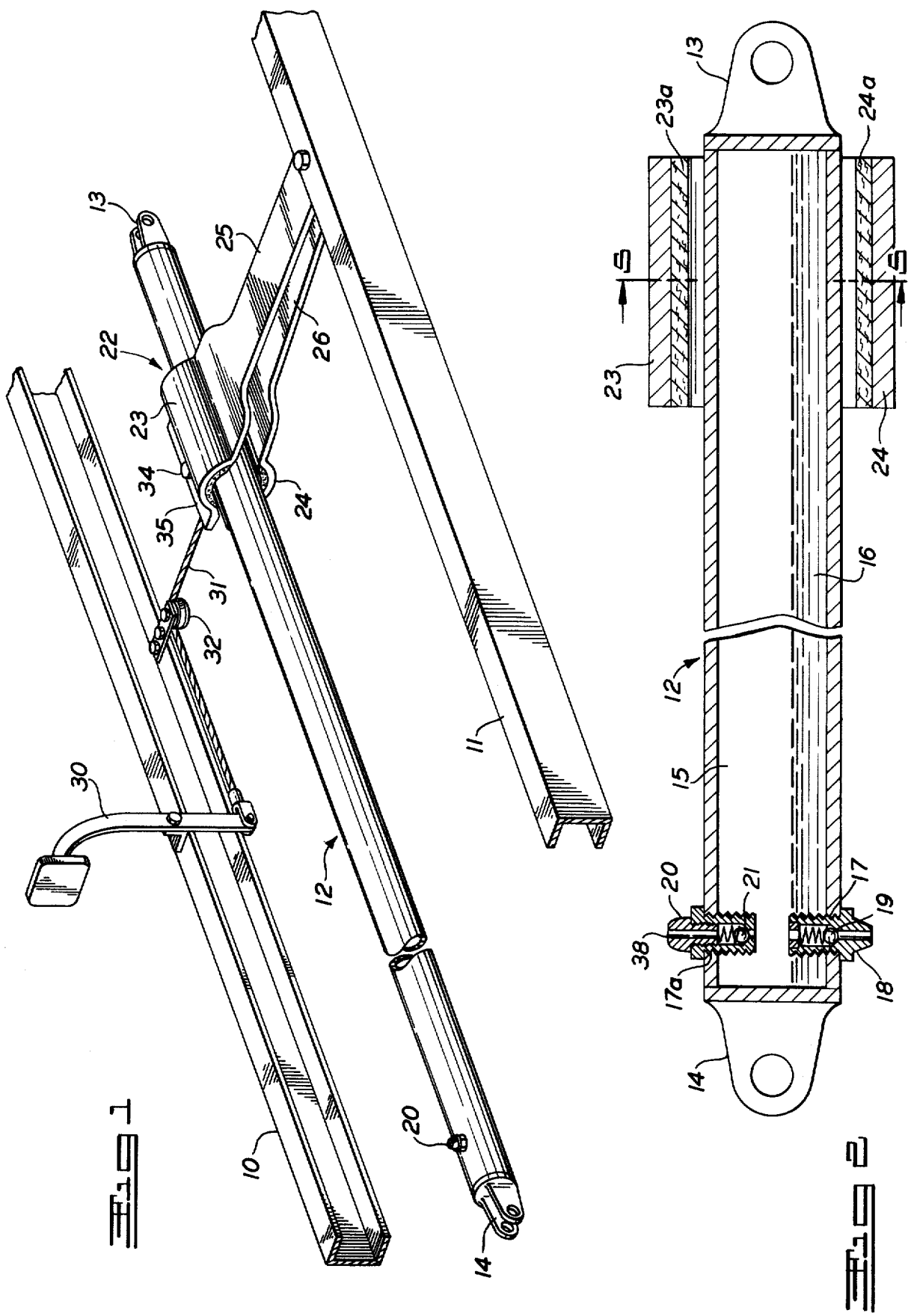

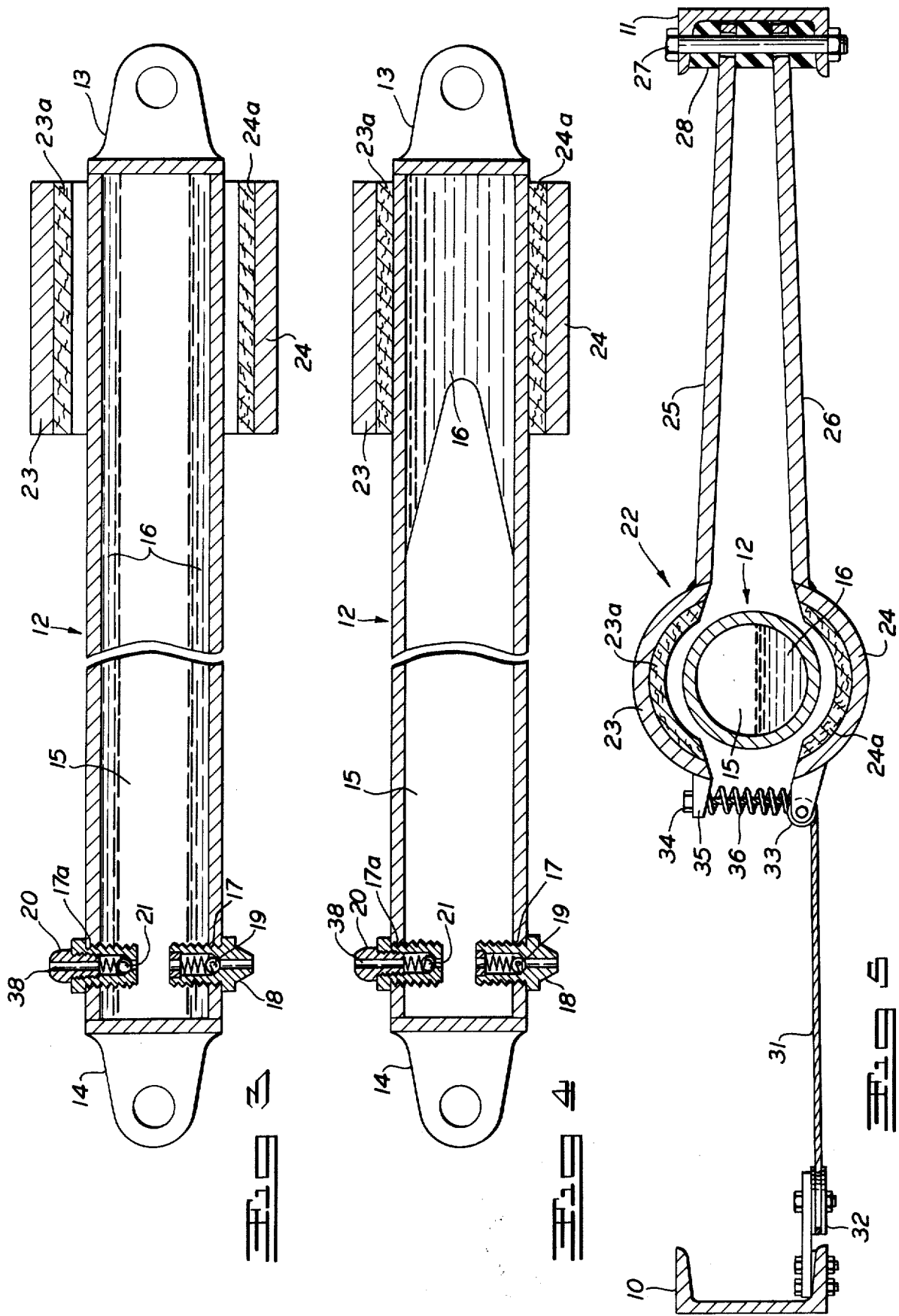

3,876,027

LIQUID COOLED EMERGENCY BRAKE FOR A MOTOR VEHICLE

BACKGROUND OF THE INVENTION

The present invention relates generally to motor vehicle emergency brakes, and more particularly to a liquid cooled emergency brake associated with a motor vehicle propeller shaft to provide vehicle braking entirely independent of the ordinary wheel service brakes of the vehicle.

Conventional emergency brakes generally comprise a hand lever or foot pedal operably connected by a tension cable to the ordinary service brakes associated with the rear wheels of a motor vehicle. In the past, when motor vehicles used relatively narrower wheels of large diameter, there was less chance of brake overheating since there was sufficient air circulation and ventilation about the brake drum to dissipate the heat generated by braking.

However, with present day wide tread and small diameter tires and wheels, air circulation in and around the wheels is reduced, thereby increasing the potential for overheating of the service brakes and consequent brake fading. Excessive temperatures, such as might be encountered during long high speed descents or repeated stops, cause brake linings to become heat-glazed, slick and/or worn to an extent where the service brakes fade and become ineffective. Once the rear service brakes become overheated, application of the conventional emergency brake is of no consequence since it operates through the already overheated and glazed brake linings associated with rear wheels of the vehicle.

The emergency brake of the present invention avoids these difficulties since it operates entirely independently of the ordinary service brakes of the vehicle and provides for efficient heat dissipation.

SUMMARY AND OBJECTS OF THE INVENTION

This invention contemplates an emergency or standby brake which utilizes the conventional tubular metal drive or propeller shaft of a motor vehicle as a rotary brake drum and as a heat-exchange chamber for a liquid coolant. The liquid coolant is flowable in the propeller shaft in a manner to efficiently transfer friction-generated heat away from the brake components and thereby prevent overheating and/or heat glazing of the friction-applying components of the brake, with consequent fading and/or failure of the emergency brake.

The principal object of the present invention is to provide an efficient, liquid cooled emergency brake which is operable independently of the ordinary service brakes of a motor vehicle and which makes use of the usual forces to which the vehicle is subjected to effectively diffuse or dissipate heat generated in the brake structure.

Another object of the invention is to provide an emergency brake structure which lends itself for installation in the conventionally manufactured motor vehicle with minimal modification of the vehicle, and which makes possible reduction in the size and area of the conventional service brakes of the vehicle.

A further object of the invention is to provide liquid cooled emergency brake having a whistling safety valve for audibly signalling the heat-induced emission or loss of the brake coolant.

A further object of the invention is to provide a liquid cooled emergency brake which is located in a position to be additionally cooled by air circulation when the vehicle is in normal motion.

BRIEF DESCRIPTION OF THE DRAWINGS

FIG. 1 is a perspective view of an emergency brake according to this invention showing its positional and functional relationship to the propeller shaft and chassis frame of a motor vehicle;

FIG. 2 is a longitudinal vertical sectional view taken through the propeller shaft and brake mechanism and illustrating diagrammatically the approximate disposition of the brake coolant when the shaft is at rest;

FIG. 3 is a similar view illustrating the approximate position of the liquid coolant during axial rotation of the shaft and zero acceleration of the vehicle;

FIG. 4 is a similar view showing the disposition of the liquid coolant resulting from simultaneous axial rotation of the propeller shaft and deceleration of the vehicle; and FIG. 5 is a transverse vertical sectional view taken approximately along the line 5—5 of FIG. 2.

DETAILED DESCRIPTION OF THE PREFFERED EMBODIMENT

Referring to FIG. 1 of the drawings, reference numerals 10 and 11 designate a pair of relatively spaced apart, longitudinally extending side members of a motor vehicle frame or chassis. The side members 10 and 11 preferably take the form of channel-shaped beams, but other beam configurations are suitable. Extending generally longitudinally of the vehicle, between the frame members 10 and 11 thereof, is the tubular metal drive or propeller shaft 12. In the usual manner, the propeller shaft 12 terminates at its forward end in a front universal joint fork or clevis 13, and at its rearward end in a rear universal joint fork or clevis 14. As will be understood without specific illustration in the drawings, the universal joint forks 13 and 14 function in the usual way to drivingly connect the propeller shaft 12 with the output shaft of the vehicle's transmission or gear box, and with the differential gears associated with the rear wheel axle of the vehicle.

As seen particularly in FIG. 2, the propeller shaft 12 comprises an elongated hollow tube which is closed at its opposite ends and which defines therein a substantially enclosed chamber 15. The present invention makes use of the chamber 15 to receive and house a body of liquid coolant indicated generally by reference numeral 16. The coolant liquid may, advantageously, consist of a readily vaporizable liquid having comparatively high specific heat and latent heat of vaporization, such as water. Since the specific heat of water is approximately 8 times that of iron, it provides an excellent heat-absorbing or cooling medium to carry heat away from the relatively small, localized area of the propeller shaft which is frictionally engaged by the brake means. The liquid coolant may, however, consist of a mixture of water and an anti-freeze, such as ethylene glycol. The liquid coolant 16 may be introduced into the chamber 15 of the shaft 12 by way of an inlet opening 17 in which is fitted a check valve 18. The check valve 18 is similar in construction and function to the well-known lubricant grease fitting, and may comprise a spring-pressed ball 19 arranged to admit fluid under pressure into the chamber 15 of the propeller shaft, while preventing the outflow of liquid from the chamber 15. The propeller shaft 12 also includes an outlet opening 17a in which is carried a pressure relief valve 20 disposed in counterbalancing relation to the check valve 18. The pressure relief valve 20 also includes a spring-pressed ball element 21 which is arranged normally to open the passage of the relief valve only in response to a given high pressure within the chamber 15, such as would occur upon heat conversion of a substantial proportion of the body of liquid 16 to steam or vapor.

Positioned adjacent and in partially encircling relation to the forward end portion of the propeller shaft 12 is a friction-applying means indicated generally by reference numeral 22. The friction-applying means, for example, may comprise a pair of generally arcuate brake shoes 23 and 24 carried, respectively, at the outer ends of a pair of pivotal support arm 25 and 26. The inner end portion of the arms 25 and 26 extend within the channel of the frame beam 11 and are secured for limited pivotal movement therein by means of a pin or bolt 27 (see FIG. 5). The inner ends of the arms 25 and 26 are also preferably embedded within a resiliently compressible cushion block 28 of rubber or other elastomeric material, in a manner to permit the inner ends of the arms 25 and 26 to "float" slightly within the channel of the frame member 11 in response to relative vertical displacement or "bounce" of the propeller shaft 12 with respect to the frame or chassis of the vehicle. Each of the brake shoes 23 and 24 are equipped with arcuate brake linings 23a and 24a which conform to and are frictionally engageable with the adjacent outer surface of the propeller shaft 12 upon application to the brake.

Any suitable, manually operated means under the control of the vehicle operator may be employed to actuate the present emergency or stand-by brake. For example, a pivotal foot pedal or lever 30 may be connected by a pulley-guided, flexible cable 31 to the shoes 23 and 24, so as to move the shoes into clamping engagement with the shaft 12. As shown in FIGS. 1 and 5, the manually operable brake lever 30 is pivoted to the frame member 10, and the inner end of the flexible cable 31 is fixed to the end of the lever 30. The intermediate portion of the cable is trained over a frame-supported guide pulley 32, thence around an anti-friction pulley or roller 33 rotatably carried at the outer end of the lower brake shoe 24. The outer end of the cable 31 is secured by an adjustable fitting 34 to the outer lip portion 35 of the upper brake shoe 23. A compression-type return spring 36 is preferably positioned between the outer end portions of the brake shoes 23 and 24, so as to bias the brake system toward a "release" position.

The liquid-receiving chamber 15 of the propeller shaft 12 is preferably only partially filled with coolant liquid, so that the liquid will flow and assume positions within the chamber in accordance with the various forces to which it is subjected upon axial rotation of the shaft (centrifugal force) and acceleration or deceleration of the vehicle (inertia). FIG. 2 of the drawing illustrates diagrammatically the theoretical disposition of the liquid coolant within the chamber 15 when both the propeller shaft and the vehicle are at rest, and assuming that the axis of the shaft is horizontal. FIG. 3 shows the theoretical disposition of the liquid 16 when the propeller shaft 15 is being driven in normal high speed rotation, but where the acceleration of the vehicle is zero, such as would occur at a constant speed or velocity. FIG. 4 illustrates the approximate disposition of the liquid coolant within the forward portion of the chamber of the propeller tube when the vehicle is decelerating, such as will occur upon braking of the vehicle.

As will be understood, the present brake, aside from its possible use as a parking brake, is intended to be used only in an emergency as a substitute or supplemental back-up for the conventional wheel service brakes of the vehicle, and would not normally be brought into operation in the absence of at least a partial failure or threat of failure of the service brakes. Thus, under normal vehicle operating conditions, no significant heat is generated in the stand-by or emergency brake components. The liquid coolant normally forms an annular, or tubular film upon the inner wall surface of the propeller shaft in response to the centrifugal forces to which the body of liquid is subjected upon axial rotation of the shaft. When the vehicle accelerates, the liquid, due to its inertia, will tend to "pile up" and occupy a position within the rearward end portion of the shaft. However, when the vehicle decelerates in response to braking or otherwise, the body of liquid will move relatively toward the forward end of the shaft, as shown in FIG. 4, where it is in position to absorb and transfer heat away from the area of the shaft which is subject to maximum frictional heating upon operation of the emergency brake.

Thus, assuming that the wheel service brakes of the vehicle have become overheated to the point of fading, or have otherwise failed, the present emergency brake may be brought into play by activating the foot pedal or lever 30 to frictionally engage the brake shoe linings 23a and 24a with the outer surface of the propeller shaft 12. The frictional drag of the brake shoes retards and/or arrests axial rotation of the shaft 12, and, thence, the rear axle and rear wheels of the vehicle. Forces resulting from deceleration cause the liquid to flow quickly to the forward end of the shaft. A substantial portion of the frictional heat generated in the metal of the shaft 12 will be substantially immediately transferred to and absorbed by the body of liquid coolant 16 which has been shifted into direct heat exchange contact with the shoe-engaged forward position of the wall of the shaft 12, due to the brake-induced deceleration of the vehicle. If the amount of heat absorbed by the body of liquid is sufficiently high, the film of liquid adjacent the friction-heated area of the metal shaft will begin to boil and vaporize. The vapors or bubbles of steam will then be centrifuged from the heavier liquid and will tend to flow rearwardly of the chamber 15 to wipe across and bathe the cooler inner wall surfaces of the metal shaft 12, to thus diffuse the heat over substantially the entire wall of the shaft.

Under most conditions, the steam or vapor generated by boiling the liquid coolant within the chamber 15 will recondense on the cooler inner wall surfaces of the shaft which are remote from the shoes 23 and 24, and which have been cleared or uncovered by displacement of the liquid to the forward end of the shaft. The recondensed liquid droplets or particles will then be immediately forced forwardly and returned to the main body of liquid by deceleration forces. However, if the heat generated is sufficient to build a head of steam within the chamber, the pressure relief valve 20 will open to permit the steam to escape under a predetermined pressure without rupturing the walls of the shaft. The pressure relief valve 20 is preferably equipped with a whistle-type orifice fitting 38 which is operable to audibly signal the escape of steam through the pressure relief valve 20, so that the vehicle operator will be apprised of the loss of at least some of the liquid coolant from the shaft.

It is also important to note that any steam or vapor which is produced by application of the brake will form or originate as bubbles at the inner wall surface of the shaft 12 adjacent the brake shoes. Such bubbles of steam or vapor are immediately displaced radially inwardly away from the shaft wall due to the centrifugal forces acting on the heavier, unvaporized part of the liquid, thus insuring a substantially continuous metal-to-liquid transfer of heat away from the relatively small area of the shaft which is subject to maximum heating by frictional engagement of the brake shoes. The centrifugal expulsion or displacement of the bubbles of steam or vapor radially inwardly of the remaining body of liquid minimizes or prevents foaming or frothing of the liquid which might otherwise impair its excellent heat absorbing qualities.

It should also be noted that the present brake mechanism is normally located beneath the vehicle in a position to be effectively cooled by the drafts of air created by forward movement of the vehicle through the atmosphere and by axial rotation of the propeller shaft.

While a presently preferred embodiment of the invention has been illustrated and described in detail, it will be understood that various modifications in details of construction and design may be made without departing from the spirit of the invention or the scope of the following claims.

I claim:

1. In combination with a motor vehicle having a rotary propeller shaft which extends generally longitudinally in the direction of normal vehicle movement; an emergency brake comprising:
   a. tube means having an outer wall forming a part of the propeller shaft of the vehicle and defining a substantially closed, axially elongated liquid-receiving chamber disposed along the axis of said shaft;
   b. a friction-applying member carried by the vehicle adjacent said tube means and movable into frictional engagement with the outer wall of said tube means; and
   c. a body of vaporizable liquid contained in the chamber of said tube means and operable to absorb a portion of the heat generated upon frictional engagement of said friction-applying member with the outer wall of said tube means.

2. The combination according to claim 1, wherein the body of vaporizable liquid only partially fills the chamber of said tube means and is flowable therein in response to centrifugal and gravitational forces.

3. The combination according to claim 2, wherein said tube means is provided with an inlet communicating with said chamber and through which liquid may be introduced into said chamber and an outlet through which vapor may be discharged under pressure from said chamber.

4. The combination according to claim 3, wherein the inlet of said tube means includes a check valve openable toward said chamber, and the outlet of said tube means includes a pressure relief valve openable in response to a predetermined high pressure within said chamber.

5. The combination according to claim 4, wherein the outlet of said tube means also includes a whistle operable in response to the escape of vapor from said chamber.

6. The combination according to claim 1, wherein said frictionapplying member is positioned to engage a forward portion only of said tube means.

7. The combination according to claim 6, wherein said frictionapplying member includes: a pair of brake shoes positioned on opposite sides of said tube means; and manually actuated means connected with said brake shoes and operable to move said shoes into frictional engagement with said tube means.

* * * * *